United States Patent [19]

Bodnar

[11] 4,053,910
[45] Oct. 11, 1977

[54] MULTIPLE EXPOSURE OPTICAL RECORDING APPARATUS

[76] Inventor: Jurij Bodnar, 41 E. 3rd Ave., San Mateo, Calif. 94401

[21] Appl. No.: 660,612

[22] Filed: Feb. 23, 1976

Related U.S. Application Data

[60] Division of Ser. No. 458,725, April 8, 1974, Pat. No. 3,940,775, which is a continuation-in-part of Ser. No. 344,107, March 23, 1973, abandoned.

[51] Int. Cl.² ............................................. G03B 15/00
[52] U.S. Cl. ..................................... 354/120; 354/295
[58] Field of Search ............... 354/122, 125, 295, 109, 354/296, 120; 350/58, 59, 60

[56] References Cited

U.S. PATENT DOCUMENTS

| 406,934 | 7/1889 | Munger | 354/122 |
|---|---|---|---|
| 1,103,745 | 7/1914 | Farquhar | 354/125 |
| 1,510,410 | 9/1924 | Menyhart et al. | 354/122 |
| 1,543,065 | 6/1925 | Douglass | 354/125 |
| 1,673,641 | 6/1928 | Ruby | 354/125 |
| 1,755,036 | 4/1930 | Sussman | 350/58 |
| 2,866,397 | 12/1958 | Gillette | 354/122 |
| 3,633,472 | 1/1972 | Meyncke | 354/109 |
| 3,719,128 | 3/1973 | Simmons | 354/122 |

FOREIGN PATENT DOCUMENTS

| 838,063 | 6/1960 | United Kingdom | 350/58 |
|---|---|---|---|

Primary Examiner—Edna M. O'Connor
Attorney, Agent, or Firm—Phillips, Moore, Weissenberger, Lempio & Majestic

[57] ABSTRACT

A method of composing pictures of objects comprises the steps of exposing a frame of a record medium such as a frame of a roll of film or a target in a television camera via a camera lens while masking a portion of the field from exposure by a first mask disposed in front of the lens. The field or frame of the record medium is then re-exposed while masking a previously unmasked portion of the field or frame. The foregoing is accomplished by apparatus in one instance comprising a camera having means for transporting film, a lens, first and second masks serving to block light to complementary portions of the film, a light shade supported by the lens to sequentially support the masks in front of the lens at a distance sufficient to inhibit exposure of complementary portions of the film.

7 Claims, 5 Drawing Figures

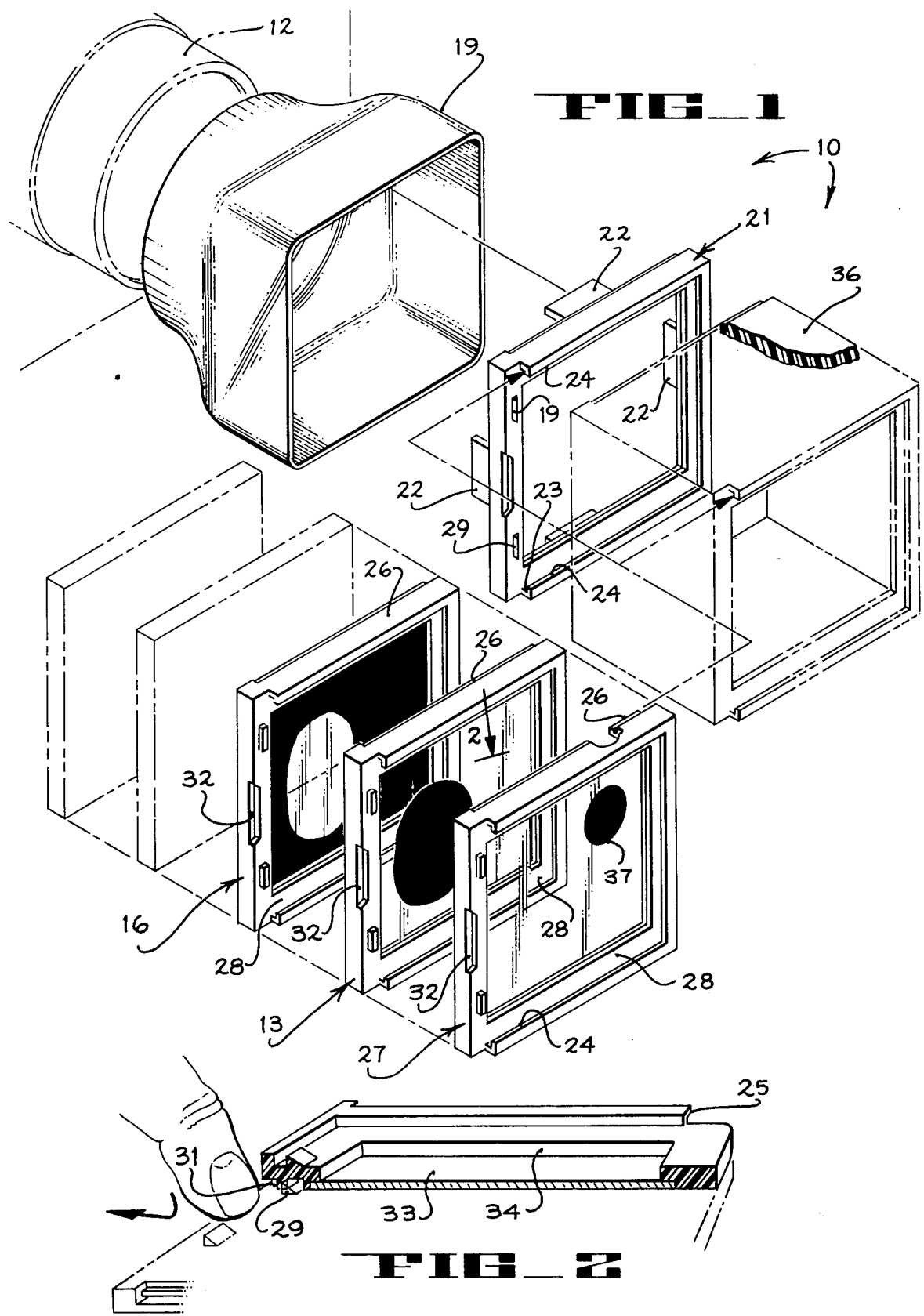

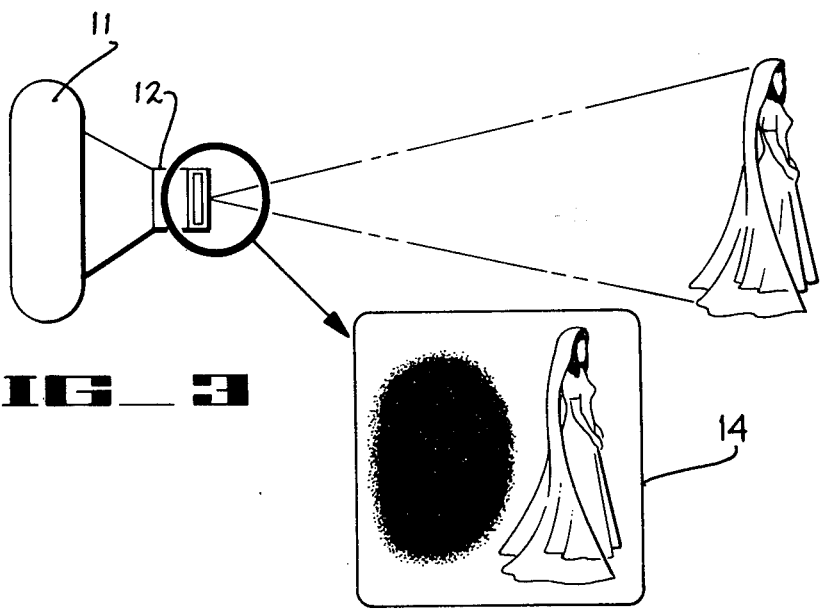
FIG_3
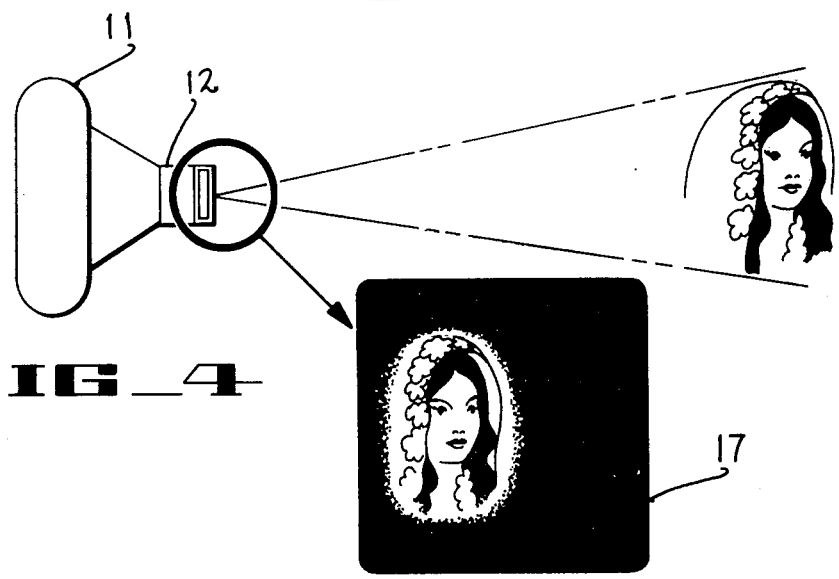
FIG_4
FIG_5

MULTIPLE EXPOSURE OPTICAL RECORDING APPARATUS

CROSS-REFERENCE TO RELATED APPLICATION

This application is a division of patent application Ser. No. 458,725 filed Apr. 8, 1974 now U.S. Pat. No. 3,940,775, for MULTIPLE EXPOSURE OPTICAL RECORDING METHOD AND APPARATUS, which is a continuation-in-part of patent application Ser. No. 344,107 filed Mar. 23, 1973, now abandoned, for MULTIPLE EXPOSURE OPTICAL RECORDING METHOD AND APPARATUS.

BACKGROUND OF THE INVENTION

This invention pertains to a method for composing pictures employing a multiple exposure optical recording method, and more particularly to apparatus useful for carrying out such method in, for example, still photography, movies, projection, and photo processing, and also in television broadcasting.

It has long been desired to provide mutltiple optical images recorded on a single record medium, such as on a single film frame or screen. Ordinarily, however, special precautions and equipment are required in order to eliminate the distinguishable edges of the areas of each of the two images which are superimposed to make a single picture.

It has further long been desired to be able to achieve the foregoing with relative simplicity without involving special treatment, such as the implementation of air brushes and the like to paint out and retouch photographs, for example.

As disclosed herein, apparatus has been provided whereby a photographer using relatively simple equipment can obtain successive exposure of adjacent areas on the same frame of a film or a television picture and leave virtually no evident line of demarcation between the areas of the images as recorded, notwithstanding differences in background of the images.

SUMMARY OF THE INVENTION

Apparatus for composing pictures of objects according to this invention includes a camera having a recording medium of given size therein, a lens serving to direct light onto the recording medium and first and second mask assemblies serving to block light to complementary portions of the recording medium. The mask assemblies each have a size corresponding in substantially one-to-one ratio with the given size of the recording medium and a means is mounted for selectively disposing each of the mask assemblies for use in succession in front of the lens at substantially that distance serving to maintain the substantially one-to-one ratio between the size of the mask assemblies and the given size of the recording medium. This arrangement facilitates the provision of substantially indistinguishable demarcation between the areas of the recording medium exposed through each of said mask assemblies.

BRIEF DESCRIPTION OF THE DRAWINGS

FIG. 1 shows a diagrammatic isometric exploded view with portions broken away of apparatus for composing pictures of multiple objects according to the method of the present invention;

FIG. 2 shows a side elevation of a mask assembly with portions broken away for clarity;

FIGS. 3 and 4 diagrammatically illustrate some of the general steps in carrying out the method of the invention; and FIG. 5 shows a picture composed according to the method of the invention employing the view subjects of FIGS. 3 and 4.

DETAILED DESCRIPTION OF A PREFERRED EMBODIMENT

Using the photographic system 10 shown in FIG. 1 and described further below, the general method to which the invention relates for composing pictures on a record medium, such as photographic film carried in a camera 11 and having a lens 12, proceeds along the steps of first exposing a frame of the film (or target of a television camera) via the lens 12 while masking a portion of the frame of film from exposure by a first mask assembly 13. Thus, if the frame of film were to be developed at this point, it would provide a frame such as shown at 14 in FIG. 3 wherein the subject has been recorded in one portion of the frame while another portion of the picture has been masked from exposure and, hence, remains unexposed.

In composite image photography, however, the next step after forming the first exposure is to dispose another mask assembly 16 in front of the camera lens so that a close-up or different picture from a different view of another subject (or the same subject) can be taken and recorded on the same frame through a previously masked portion of the frame. If this step were executed solely by itself, it would provide a developed frame of the type shown in FIG. 4 at 17 with a protected, unexposed portion.

By protecting a portion of the film frame from exposure as in FIG. 3 and reserving that portion for later exposure, the picture can be composed of a plurality of images as shown in FIG. 5 at 18.

In the past, however, there has been difficulty in providing an appropriate demarcation between the two exposures on the film. In this connection, one of the more troublesome problems with composite image photography has been the overlapping at the boundary of the two images. According to this invention, it has been discovered that the location at which the masks are positioned in front of the lens is most desirably one providing a generally 1-to-1 ratio between the area of the mask and the area of the film frame exposable by such lens. Such positioning has the advantage of facilitating the composition of the photograph since the boundary between the two exposures on the film will correspond with the boundary visible in the view finder.

It should be noted that this invention is not only applicable to composite image photography when the masks include an opaque and transparent area, but also when one of the masks includes a translucent area, such as is used in color vignetting. Thus, for the purposes of the invention, it is only necessary that the two adjacent areas in each mask be of differing light transmission qualities, rather than necessarily opaque and transparent.

Having in mind the foregoing method, it will be readily appreciated that relatively precise registration between the regions of two successively employed masks is required in order to avoid the formation of a line of definition at the area of one or the other of the two masked portions. Accordingly, the apparatus shown in FIGS. 1 and 2 serves to provide substantially precise registration of any number of masks so as to avoid the problem of creating a demarcation line where a first mask and a second mask fail to precisely register. The precision required by the above circumstances is readily achieved by the utilization of glass or other optically ground, transparent panes as used herein whereby the masking portion thereof can be accurately disposed thereon.

With reference to FIGS. 1 and 2, a support, such as a sun or other light shade 19, serves to dispose the masks at that distance in front of lens 12 maintaining substantially a one-to-one ratio between the size of the mask and the size of the overall area of the record medium to be recorded upon. Sun shade 19 includes a generally square configuration on one end and a cylindrical configuration on the other arranged to be secured to lens 12 by any suitable means well known to those in the art, such as by a bayonet connection or simply a press fit. Lens 12 for the moment will be deemed to be a standard focal length lens. Later, using sun shade extender 36 the same mask assemblies can be employed with a telephoto lens.

A supporting assembly 21 is readily secured to sun shade 19 by insertion of the four tangs 22 which snugly fit in a wedged relation within the opening of the square end of sun shade 19. Support assembly 21 includes on its forward face a pair of elongated retaining flanges forming slots 23 defined by lips 24 on opposite sides of the assembly frame folded over toward each other in confronting relationship. Oppositely facing lips 26 are carried on the backside of each mask assembly to be mounted on assembly 21. Thus, an upwardly facing lip 26 is shown on mask assembly 27 and is understood to be similarly disposed on the other mask assemblies 13 and 16 for forming with upper lips 24 a connection similar to that of a sliding tongue-and-groove connection. A similar downwardly directed elongated lip member 25 is carried along the bottom transverse member 28 of the assemblies 13, 16, 27 on the backside thereof (FIG. 2) so as to engage the upwardly extending lower lip 24.

It is readily evident that any one of mask assemblies 13, 16 or 27 is arranged to slide laterally into aligned position with regard to the optical axis of lens 12 simply by urging the assemblies 13, 16, 27 laterally while in engagement with the lip arrangement just described. A pane of glass 33 is cemented into the frame forming each assembly. Each pane includes portions which are transparent to light and portions which inhibit the transmission of light therethrough. Thus, the darkly shaded areas in FIG. 1 are intended to represent those portions which are essentially black or intended to inhibit light passing therethrough, typically totally.

In utilizing this apparatus, mask assembly 13 would first be positioned onto support assembly 21 as noted above for the first exposure. It should be noted that cooperating means have been provided on both support assembly 21 and on the reverse side of each of the mask assembly 13, 16, 27 for retaining a mask assembly from loosely sliding to the left as viewed in FIG. 1. Thus, the retaining nibs 29 serve to engage downwardly (FIG. 2) directed nibs of similar extent 31, and by simply inserting a fingernail into the slot 32 and gently pressing rearwardly, nibs 29 and 31 may be separated for sliding movement.

With the above construction, a number of mask assemblies can be cascaded together to form various patterns and designs as desired. Moreover, as is well known, use of complementary masks or other masks in positions adjacent the film but behind the lens serves to provide relatively sharp outlines in the areas controlled by the masks. However, in the present instance where the mask assemblies are disposed in front of the lens, this is not true.

In the event that lens 12 is a telephoto lens having a longer focal length and narrower lens angle, it is preferred to employ extender unit 36 in front of the sun shade 19 to obtain the previously discussed one-to-one ratio. The extender is face constructed in the manner of the front and rear sides of each of the masks to include flange assemblies for interlocking sliding relationship. Unit 36 thereby serves to support the mask assemblies at an appropriate position from a telephoto lens whereby they can also be effective when used with a telephoto lens to maintain substantially a one-to-one ratio between the size of the mask and the size of the overall area of the record medium to be recorded upon. Thus, the same mask assemblies 13, 16, 27 are usable with both a standard lens and a telephoto lens.

It is preferable to form the mask assemblies of a size corresponding to the size of the frame of film or other record image. This simplifies the task of composing multi-image pictures. Moreover, this feature, along with the previously discussed location of the masks a distance in front of the lens providing substantially a one-to-one ratio between the size of the mask and the size of the overall area of the record medium to be recorded upon, assures that the images of the boundaries will be congruent with one another.

It should be observed that two or more mask assemblies can be readily combined such as 13 and 27 to provide a first exposure of the record material and then frame 16 can be employed to take a second exposure of the same film in the region protected by mask 13. Ultimately, a third exposure can be made in the small circular region 37 formed in the pane of glass in mask assembly 27.

From the foregoing, it will be readily evident that a substantial improvement is achieved by locating the masks in front of the lens at an appropriate distance so as to facilitate the provision of substantially indistinguishable demarcations between the regions containing images recorded at different times and under different conditions on the same record frame.

What is claimed is:

1. Apparatus for composing pictures of objects comprising a camera having means for transporting film with frames each of given size therethrough, a lens serving to direct light onto said film, first and second mask assemblies serving to block light to complementary portions of a frame of said film, said first and second mask assemblies each having a size corresponding to said given size of said frames of said film, and means serving to dispose each of said first and second mask assemblies for use in succession in front of said lens comprising a tubular sun shade mounted on said camera with one end surrounding said lens and having an axial length substantially equal to that distance serving to maintain substantially a one-to-one ratio between said size of said mask assemblies and said given size of said frames of said film to inhibit exposure of complementary portions of a frame to said film and to facilitate the provision of substantially indistinguishable demarcation between the areas of the recorded images of said objects recorded at different positions on said film.

2. Apparatus as claimed in claim 1 wherein said frames of said film are generally square in configuration, said mask assemblies are generally square in configuration, and said one end of said tubular sun shade has a cylindrical configuration, the other end of said sun shade having a generally square configuration with a size corresponding in substantially one-to-one ratio to the size of said mask assemblies.

3. Apparatus as claimed in claim 1 wherein said one end of said sun shade is provided with means for removably mounting said sun shade about said lens of said camera, said mask assemblies include a supporting assembly and said other end of said sun shade and said supporting assembly of each of said mask assemblies are provided with interlocking mounting means for removably mounting said mask assemblies on said other end of said sun shade.

4. Apparatus as claimed in claim 1 wherein the other end of said sun shade lies in a plane extending normal to said axial length thereof, and said sun shade comprises two tubular portions removably mounted to each other along a plane intermediate said ends and extending normal to said axial length thereof.

5. Apparatus for composing pictures of objects comprising a camera having a recording medium of given size therein, a lens serving to direct light onto said recording medium, first and second mask assemblies serving to block light to complementary portions of said recording medium, said first and second mask assemblies each having a size corresponding in substantially one-to-one ratio with said given size of said recording medium, and means comprising a tubular member mounted on said camera coaxial with said lens with one end thereof surrounding said lens for selectively disposing each of said first and second mask assemblies for use in succession in front of said lens at substantially that distance serving to maintain said substantially one-to-one ratio between said size of said mask assemblies and said given size of said recording medium to facilitate the provision of substantially indistinguishable demarcation between the areas of the recording medium exposed through each of said mask assemblies a portion of the axial length of said tubular member at the other end thereof having a configuration and size corresponding in substantially one-to-one ratio with said given size of said recording medium.

6. Apparatus as claimed in claim 5 wherein means are provided for mounting said mask assemblies at said other end of said tubular member with a removable interlocking fit.

7. Apparatus as claimed in claim 6 wherein said tubular member is divided into two portions intermediate said ends thereof and means are provided for mounting said two portions to each other which means is substantially identical to said means for mounting said mask assemblies at said other end of said tubular member with a removable interlocking fit.

* * * * *